(12) United States Patent
Hwang et al.

(10) Patent No.: US 8,352,931 B2
(45) Date of Patent: Jan. 8, 2013

(54) DATA PUSH SERVICE METHOD AND SYSTEM USING DATA PULL MODEL

(75) Inventors: Sang-chul Hwang, Suwon-si (KR); Won-joo Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 11/542,111

(22) Filed: Oct. 4, 2006

(65) Prior Publication Data

US 2007/0124422 A1 May 31, 2007

(30) Foreign Application Priority Data

Oct. 4, 2005 (KR) .................. 10-2005-0093070

(51) Int. Cl.
*G06F 9/44* (2006.01)

(52) U.S. Cl. ......... 717/168; 717/172; 717/174; 709/203

(58) Field of Classification Search .................. 717/168, 717/172; 709/203, 231
See application file for complete search history.

(56) References Cited

U.S. PATENT DOCUMENTS

| | | | | |
|---|---|---|---|---|
| 5,923,756 A * | 7/1999 | Shambroom | ................. | 713/156 |
| 6,041,359 A | 3/2000 | Birdwell | | |
| 6,421,781 B1 * | 7/2002 | Fox et al. | .......................... | 726/4 |
| 6,795,864 B2 | 9/2004 | Connor | | |
| 7,058,691 B1 * | 6/2006 | Yu et al. | ......................... | 709/207 |
| 7,295,550 B2 * | 11/2007 | Shimba et al. | ................ | 370/352 |
| 7,516,135 B2 * | 4/2009 | Bayyapu | ............................... | 1/1 |
| 7,617,525 B1 * | 11/2009 | Moeck et al. | .................... | 726/11 |
| 2002/0035597 A1 * | 3/2002 | Khodko et al. | ............... | 709/203 |
| 2002/0052957 A1 | 5/2002 | Shimada | | |
| 2002/0073245 A1 * | 6/2002 | Hallford | ........................ | 709/331 |
| 2002/0110123 A1 * | 8/2002 | Shitama | ........................ | 370/389 |

(Continued)

FOREIGN PATENT DOCUMENTS

CN 1468401 A 1/2004

(Continued)

OTHER PUBLICATIONS

Swarup Acharya, "Balancing Push and Pull for Data Broadcast", 1997, Brown University, ACM, (Acharya.pdf).*

(Continued)

*Primary Examiner* — Emerson Puente
*Assistant Examiner* — Hiren Patel
(74) *Attorney, Agent, or Firm* — Sughrue Mion, PLLC

(57) ABSTRACT

A data push service method and system are provided. The service data push method includes: providing a device with data push information regarding service data to be pushed to at least one device; and pushing the service data to the device when receiving a data push service request from the at least one device. Accordingly, the server does not need to maintain and manage information of the at least one device.

27 Claims, 5 Drawing Sheets

U.S. PATENT DOCUMENTS

| | | | |
|---|---|---|---|
| 2002/0178289 A1* | 11/2002 | Kurose | 709/245 |
| 2003/0084108 A1* | 5/2003 | Syed | 709/206 |
| 2003/0084140 A1* | 5/2003 | Takeuchi et al. | 709/223 |
| 2003/0093476 A1* | 5/2003 | Syed | 709/204 |
| 2003/0115348 A1* | 6/2003 | Ohashi | 709/230 |
| 2003/0212772 A1* | 11/2003 | Harris | 709/220 |
| 2004/0068363 A1* | 4/2004 | Goto | 701/200 |
| 2004/0078474 A1 | 4/2004 | Ramaswamy | |
| 2004/0125801 A1* | 7/2004 | Nawata | 370/389 |
| 2004/0181575 A1* | 9/2004 | Mallberg et al. | 709/203 |
| 2004/0243617 A1* | 12/2004 | Bayyapu | 707/102 |
| 2005/0063329 A1* | 3/2005 | Lee et al. | 370/328 |
| 2005/0108397 A1* | 5/2005 | Basso et al. | 709/225 |
| 2005/0131999 A1* | 6/2005 | Bolosky et al. | 709/203 |
| 2005/0220076 A1* | 10/2005 | Kokado | 370/351 |
| 2006/0020688 A1* | 1/2006 | Chang et al. | 709/219 |
| 2006/0187891 A1* | 8/2006 | Sairanen | 370/338 |

FOREIGN PATENT DOCUMENTS

| | | |
|---|---|---|
| JP | 08-172437 A | 7/1996 |
| KR | 2000-0058858 A | 10/2000 |
| WO | 03/038674 A1 | 5/2003 |

OTHER PUBLICATIONS

Acharya et al. "Balancing Push and Pull for Data Broadcast", Proceedings of ACM SIGMOD Conference, Tuscon, Arizona, May 1997, (Acharya_1997.pdf; pp. 1-16).*

Communication dated Apr. 25, 2012 issued by the State Intellectual Property Office of P.R. China in counterpart Chinese Application No. 200610172986.6.

* cited by examiner

US 8,352,931 B2

DATA PUSH SERVICE METHOD AND SYSTEM USING DATA PULL MODEL

CROSS-REFERENCE TO RELATED PATENT APPLICATION

This application claims priority from Korean Patent Application No. 10-2005-0093070, filed on Oct. 4, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to providing services to a device, and more particularly, to providing a data push service to a device.

2. Description of the Related Art

Web browsers enable users to actively search for data on the Internet. However, this web browser-based search method is sometimes time-consuming and requires users to repeatedly access Internet websites to obtain up-to-date data. A method in which a user actively requests service data and then obtains the service data is referred to as a data pull method. In the data pull method, a client initiates a session for communication with a server.

By contrast, a method in which a broadcast station such as a TV broadcast station keeps transmitting service data and a user chooses one of a plurality of channels provided by the broadcast station is referred to as a data push method. In the data push method, a server initiates a session for communication with a client. TV broadcast services provided in the data push method are referred to as data push services.

FIG. 1 is a schematic diagram of a related art data service push system. Referring to FIG. 1, the related art data push service system includes first through third devices 11 through 13, a network address translation (NAT) node 14, a firewall 15, and a server 16. A data push service can be provided to at least one of the first through third devices 11 through 13 by the server 16. It will now be described how the server 16 provides a data push service to the first device 11.

The first device 11 provides information on itself to the server 16 and thus registers itself with the server 16. Thereafter, the server 16 stores the obtained information of the first device 11. The registration of the first device 11 with the server 16 is carried out during a predetermined session initiated by the first device 11.

The NAT node 14 and the firewall 15 exist between the first through third devices 11 through 13 and the server 16 and thus the devices 11 through 13 and server 16 can communicate with each other only via the NAT node 14 and the firewall 15. In detail, while the first device 11 registers itself with the server 16, the NAT node 14 translates a local IP address included in a message transmitted by the first device 11 into a global IP address with reference to the local IP address and the global IP address of the first device 11. The firewall 15 allows the transmission of service data that uses a predetermined port corresponding to a port number allotted for a data push service requested by the first device 11 and disallows the transmission of service data that uses a port other than the predetermined port.

In order that the NAT node 14 and the firewall 15 can perform the aforementioned functions properly, the first device 11 provides the NAT node 14 and the firewall 15 with information including the local IP address and the global IP address of the first device 11 and the port number allotted for the requested data push service. A local IP address is an address used in a local network and is also referred to as a private IP address. A global IP address is an address used in a global network and is also referred to as a public IP address.

Thereafter, if service data to be pushed to the first device 11 is generated, the server 16 pushes the service data to the first device 11 with reference to the information of the first device 11 stored therein. This data push service operation is carried out during a predetermined session initiated for a data push service. While the server 16 pushes the service data to the first device 11, the NAT node 14 translates a global IP address included in a message transmitted by the server 16 into a local IP address with reference to the local IP address and the global IP address of the first device 11, and the firewall 15 allows the transmission of service data that uses the predetermined port and disallows the transmission of service data that uses a port other than the predetermined port.

In order that the NAT node 14 and the firewall 15 can perform the aforementioned functions properly, the server 16 provides the NAT node 14 and the firewall 15 with the information of the first device 11 including the local IP address and the global IP address of the first device 11 and the port number allotted for the requested data push service.

The server 16 must provide the information of the first device 11 to the NAT node 14 and the firewall 15 whenever it wishes to push service data to the first device 11. Therefore, the server 16 must maintain and manage the information of the first device 11. However, since the server 16 serves a plurality of devices including the first device 11, the maintenance and management of information of all the devices results in a considerable load on the server 16. In addition, the greater the number of devices that the server 16 need to push service data to, the larger the amount of information that the server 16 must manage. For this, the storage capacity of the server 16 may have to be increased frequently.

The NAT node 14 translates an address for a session initiated by a client. However, in order that the NAT node 14 can translate an address for a session initiated by a server, the NAT node 14 must be equipped with an additional function that enables the NAT node to translate an address included in a message transmitted by the server. Also, most web servers provides service through a port number 80. In addition, in order that the firewall 15 can prevent the transmission of service data, a network administrator must allot a predetermined port number exclusively for the data push service requested by the device 11.

In order for a server to provide data push services to clients, network infrastructure capable of meeting the aforementioned requirements must be established. However, the establishment of such network infrastructure is costly. Therefore, currently, the application of data push services is limited to areas such as corporation markets or large-scale business-to-business (B2B) housing complexes.

SUMMARY OF THE INVENTION

The present invention provides a data push service method and system which do not require a server to maintain and manage information of devices and do not require the establishment of network infrastructure as is needed in related art data push service techniques.

The present invention also provides a computer-readable medium storing a computer program for executing the data push service method.

According to an aspect of the present invention, there is provided a service data push method including: providing a device with data push information regarding service data to be pushed to at least one device; and pushing the service data to the device when receiving a data push service request from the at least one device.

According to another aspect of the present invention, there is provided a server including: a push information providing unit which provides a device with data push information regarding service data to be pushed to at least one device; and a service data push unit which pushes the service data when receiving a data push service request from the device which has obtained the data push information.

According to another aspect of the present invention, there is provided a computer-readable medium storing a computer program for executing the service data push method described above.

According to another aspect of the present invention, there is provided a service data processing method including: obtaining data push information regarding service data to be pushed from a server; issuing a data push service request to the server with reference to the data push information; and receiving the service data in return for the data push service request and processing the received service data.

According to another aspect of the present invention, there is provided a device including: a push information obtaining unit which obtains data push information regarding service data to be pushed from a server; a service request unit which issues a data push service request to the server with reference to the data push information; and a service data processing unit which receives service data pushed by the server in return for the data push service request and processes the received service data.

According to another aspect of the present invention, there is provided a computer-readable medium storing a computer program for executing the service data processing method described above.

According to another aspect of the present invention, there is provided a data push service system including: a server which provides a device with data push information regarding service data to be pushed to at least one device; and the device which obtains the data push information from the server and issues a data push service request to the server with reference to the obtained data push information, wherein the server pushes the service data to the at least one device when receiving the data push service request from the at least one device.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings in which exemplary embodiments of the invention are shown.

Figure 1:
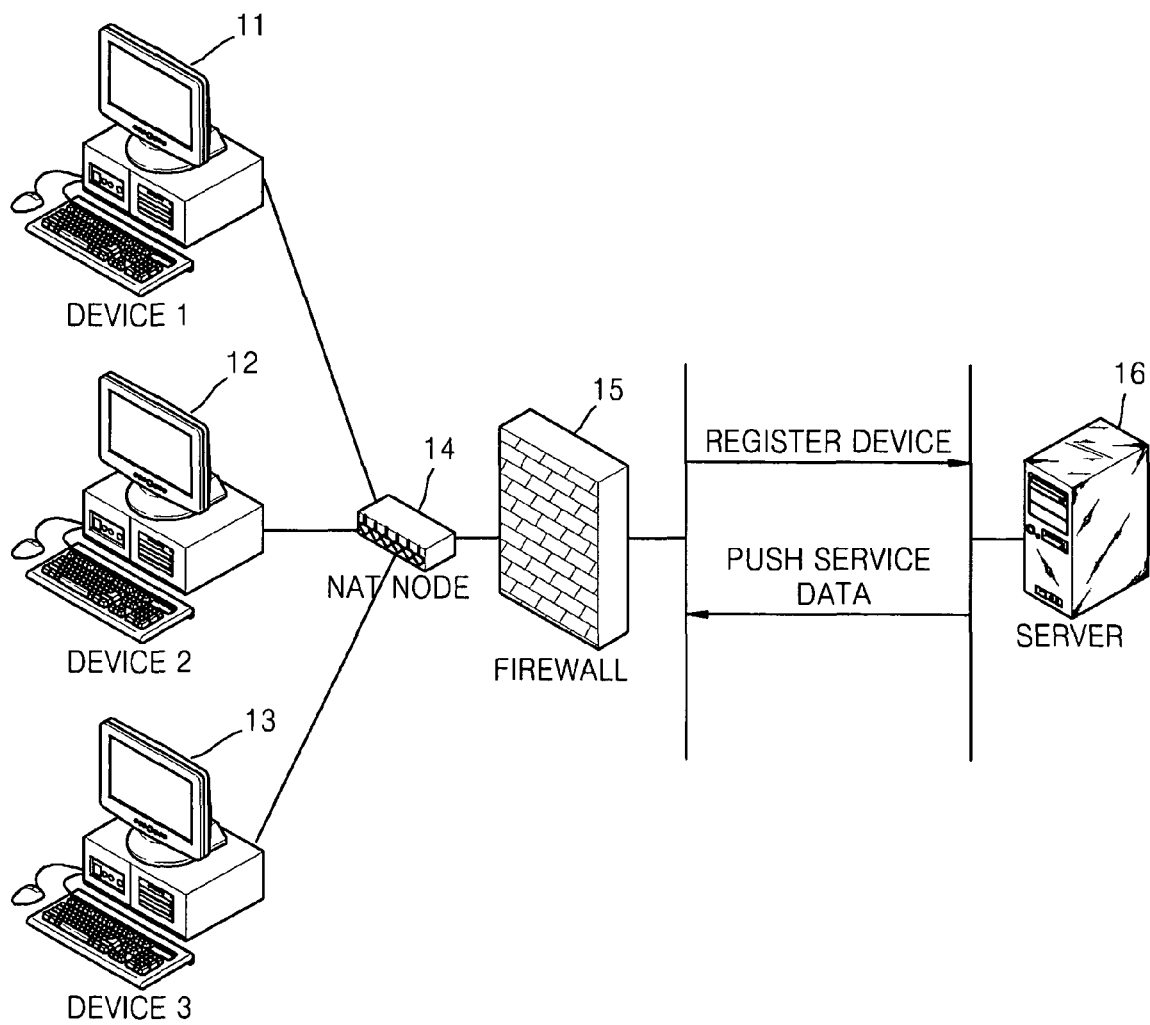
FIG. 1 is a schematic diagram of a related art data push service system.
Figure 2:
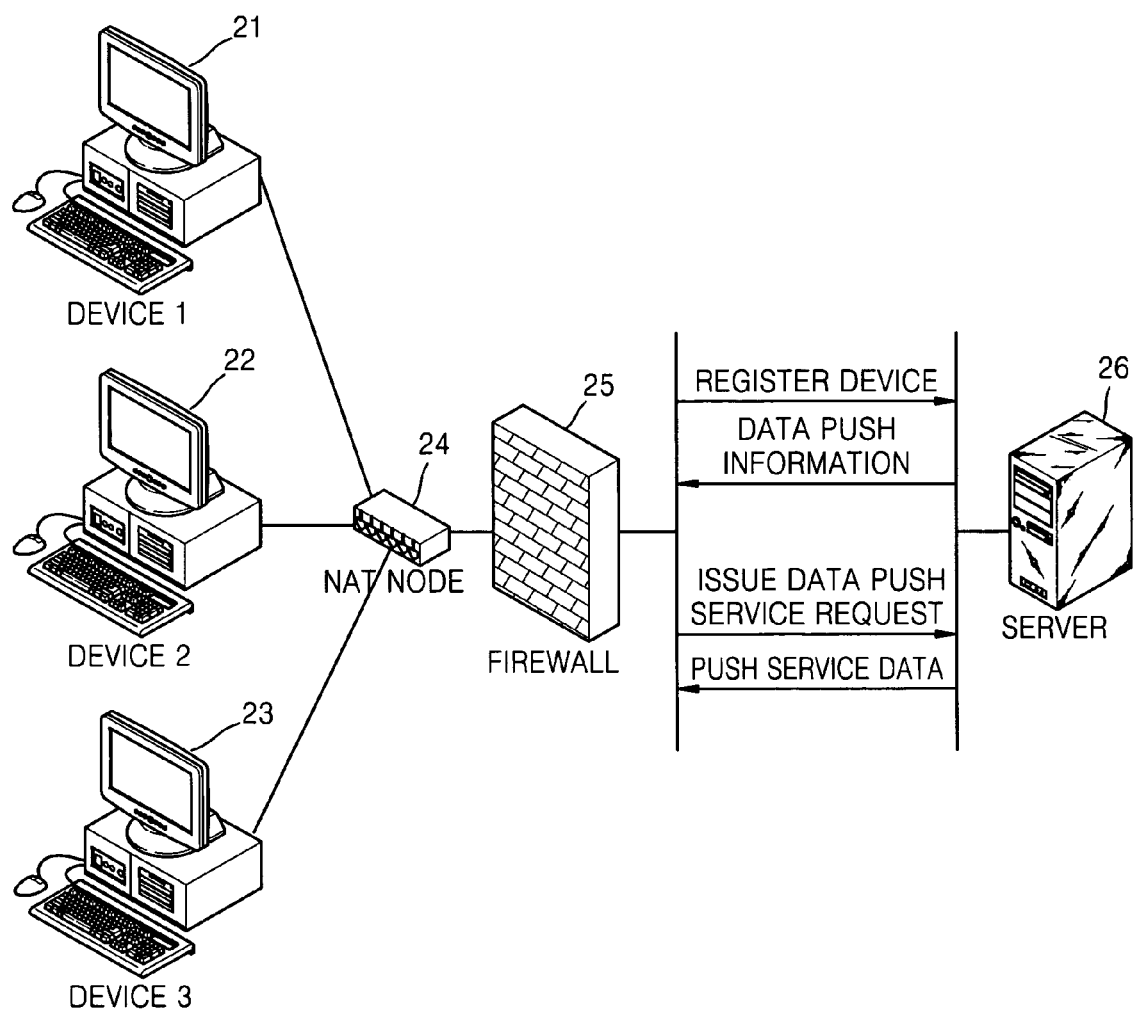
FIG. 2 is a schematic diagram of a data push service system according to an exemplary embodiment of the present invention.

FIG. 2 is a schematic diagram of a data push service system according to an exemplary embodiment of the present invention. Referring to FIG. 2, the data push service system includes first through third devices 21 through 23, a network address translation (NAT) node 24, a firewall 25, and a server 26. A data push service may be provided to at least one of the first through third devices 21 through 23 by the server 26. It will now be described how the server 26 provides a data push service to the first device 21. It is obvious to one of ordinary skill in the art that the server 26 can provide a data push service to an arbitrary device other than the first device 21.

The first device 21 provides registration information on itself to the server 26 and thus registers itself with the server 26 (The server 26 thus obtains the registration information on the first device 21. Thereafter, the server 26 generates data push information regarding service data to be pushed based on the registration information of the first device 21 and provides the data push information to the first device 21.

The registration of the first device 21 with the server 26 and the obtaining of the data push information by the first device 21 are carried out during a first session initiated by the first device 21 for registering the first device 21 with the server 26.

Thereafter, the first device 21 issues a data push service request to the server 26 with reference to the data push information. Then the server 26 pushes service data in response to the data push service request issued by the first device 21. The first device 21 processes the service data pushed by the server 26 using a method predefined by a data push service requested by the first device 21.

The issuance of the data push service request and the processing of the service data by the first device 21 are carried out during a second session initiated by the first device 21 for obtaining service data from the server 26.

In a data pull method, a device initiates a session, while, in a data push method, a server initiates a session. According to the current exemplary embodiment of the present invention, however, the first device 21 initiates a session for a data push service. Therefore, the data push service system according to the current exemplary embodiment of the present invention may be regarded as a data push service system using the data pull method.

While data is transmitted from the first device 21 to the server 26 in order to register the first device 21 with the server 26 or in order for the first device 21 to issue a data push service request to the server 26, the NAT node 24 translates a local IP address included in the data into a global IP address with reference to a local IP address and a global IP address of the first device 21, and the firewall 25 allows transmission of service data that uses a predetermined port corresponding to a port number allotted for the requested data push service and disallows transmission of service data that uses a port other than the predetermined port.

In order that the NAT node 24 and the firewall 25 can perform the aforementioned functions properly, the first device 21 must provide the NAT node 24 and the firewall 25 with the information of the first device 21 including the local IP address and the global IP address of the first device 21 and the port number allotted for the requested data push service.

When data is transmitted from the server 26 to the first device 21 in order for the server 26 to provide the data push information to the first device 21 or to push service data to the first device 21, the NAT node 24 translates a global IP address included in the data into a local IP address with reference to the local IP address and the global IP address of the first device 21, and the firewall 25 allows transmission of service data that uses the predetermined port and disallows transmission of service data that uses a port other than the predetermined port.

In order for the NAT node 24 and the firewall 25 to perform the aforementioned functions properly, the server 26 must provide the NAT node 24 and the firewall 25 with the information of the first device 21 including the local IP address and the global IP address of the first device 21 and the port number allotted for the requested data push service.

Figure 3:
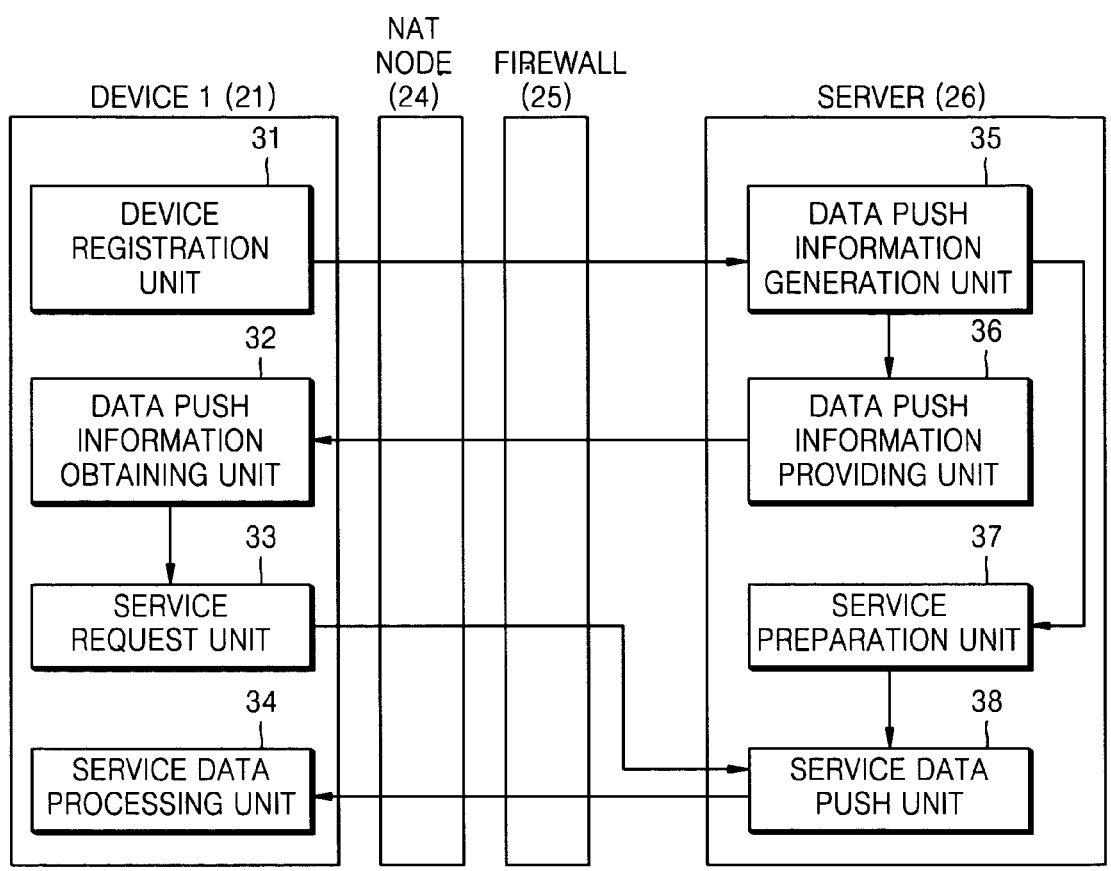
FIG. 3 is a block diagram of a first device and a server of the data push service system illustrated in FIG. 2 according to an exemplary embodiment of the present invention.

FIG. 3 is a detailed block diagram of the first device 21 and the server 26 of the data push service system illustrated in FIG. 2 according to an exemplary embodiment of the present invention. Referring to FIG. 3, the first device 21 includes a device registration unit 31, a data push information obtaining unit 32, a service request unit 33, and a service data processing unit 34.

The device registration unit 31 initiates a first session for registering the first device 21 with the server 26. During the first session, the first device 21 transmits a message including registration information of the first device 21 to the server 26. Here, the registration information of the first device 21 is information needed for providing data push information to the first device 21 and comprises data push service information regarding a data push service requested by the first device 21 and information of the first device 21. The information of the first device 21 comprises a local IP address and a global IP address of the first device 21, and a port number allotted for the requested data push service.

The data push information obtaining unit 32 obtains data push information from a message transmitted by the server 26 which has received the registration information of the first device 21 from the data registration unit 31. The data push information is the push information for service data to be pushed to the first device 21 by the server 26 and comprises push time information specifying when the service data is to be pushed to the first device 21 and a predetermined data push service code showing data push service.

The service request unit 33 initiates a second session for obtaining service data from the server 26. During the second session, the service request unit 33 issues a data push service request to the server 26 with reference to the data push information obtained by the data push information obtaining unit 32. In detail, while the data push information obtaining unit 32 obtains the data push information from the server 26, the service request unit 33 is in a standby mode until a time specified by the push time information included in the data push information and transmits a message containing service request information to the server 26 at the time specified by the push time information, thereby issuing a data push service request to the server 26.

The service request information is information required by the server 26 to push service data to the first device 21 and comprises a service code corresponding to the requested data push service and the information of the first device 21. The information of the first device 21 comprises the local IP address and the global IP address of the first device 21 and the port number allotted for the requested data push service. Since the service request information comprises the information of the first device 21, the information of the first device 21 is provided to the server 26 whenever the service request unit 33 issues a data push service request to the server 26. Therefore, according to the current exemplary embodiment of the present invention, unlike in the related art, the server 26 does not need to maintain and manage the information of the first device 21.

The service data processing unit 34 receives the service data pushed by the server 26 in return for the data push service request issued by the service request unit 33 and processes the received service data using a method predefined by the requested data push service. A data push service is a service provided unilaterally by the server 26 and may include a TV broadcast service in which media content is consecutively transmitted by a TV broadcast station and an emailing service in which email is transmitted by an email server even when not requested by a user. In other words, the service data processing unit 34 may reproduce media content transmitted by a TV broadcast station or output email transmitted by an email server to a user.

Referring to FIG. 3, the server 26 includes a data push information generation unit 35, a data push information providing unit 36, a service preparation unit 37, and a service data push unit 38.

During the first session initiated by the device registration unit 31 of the first device 21, the data push information generation unit 35 obtains registration information of the first device 21 from the first device 21 and generates data push information based on the registration information of the first device 21 while the first device 21 registers itself with the server 26. The registration information of the first device 21 is information required for providing data push information to the first device 21 and comprises the data push service information regarding the requested data push service and information of the first device 21. The information of the first device 21 comprises the local IP address and the global IP address of the first device 21, and the port number allotted for the requested data push service. The data push information is the push information for service data to be pushed to the first device 21 by the server 26 and comprises push time information specifying when the service data is to be pushed to the first device 21 and a predetermined data push service code showing data push service.

In detail, while the first device 21 registers itself with the server 26, the data push information generation unit 35 generates the predetermined data push service code with reference to the data push service information and allots the predetermined data push service code to the requested data push service so that the requested data push service can be identified by the predetermined data push service code. The data push information generation unit 35 determines when to push service data and generates the push time information based on the determination result. In detail, while the first device 21 registers itself with the server 26, the data push information generation unit 35 calculates the amount of time required to generate service data for the requested data push service and determines when to push the service data based on the calculation result.

The data push information providing unit 36 provides the data push information generated by the data push information generation unit 35 to the first device 21 by transmitting a message containing the data push information to the first device 21. In detail, the data push information providing unit 36 provides the predetermined data push service code and the push time information generated by the data push information generation unit 35 to the first device 21 by transmitting a message containing the predetermined data push service code and the push time information to the first device 21.

During the second session initiated by the service request unit 33 of the first device 21, the service preparation unit 37 prepares service data so that the service data can be pushed at a predetermined time specified by the push time information generated by the data push information generation unit 35. In detail, the service preparation unit 37 completes the generation of service data to be pushed to the first device 21 by the predetermined time specified by the push time information generated by the data push information generation unit 35.

During the second session, the service data push unit 38 pushes the service data prepared by the service preparation unit 37 to the first device 21 when receiving the data push service request issued by the first device 21. In other words, the service data push unit 38 pushes the service data prepared by the service preparation unit 37 to the first device 21 as soon as it receives from the first device 21 the data push service request issued with reference to the push time information provided by the data push information providing unit 36.

In detail, the service data push unit 38 receives a message containing the service request information from the first device 21 which has obtained the data push information from the data push information providing unit 36, thereby receiving the data push service request issued by the first device 21. The service request information is information required by the server 26 to push service data to the first device 21 and comprises the predetermined data push service code corresponding to the requested data push service and the information of the first device 21. The information of the first device 21 comprises the local IP address and the global IP address of the first device 21, and the port number allotted for the requested data push service.

Therefore, the service data push unit 38 pushes the service data prepared by the service preparation unit 37 to the first device 21 with reference to the service request information. In detail, the service data push unit 38 pushes service data corresponding to the data push service designated by the predetermined service code to a device having the global IP address included in the service request information, i.e., the first device 21, via a port corresponding to the port number included in the service request information.

Figure 4:
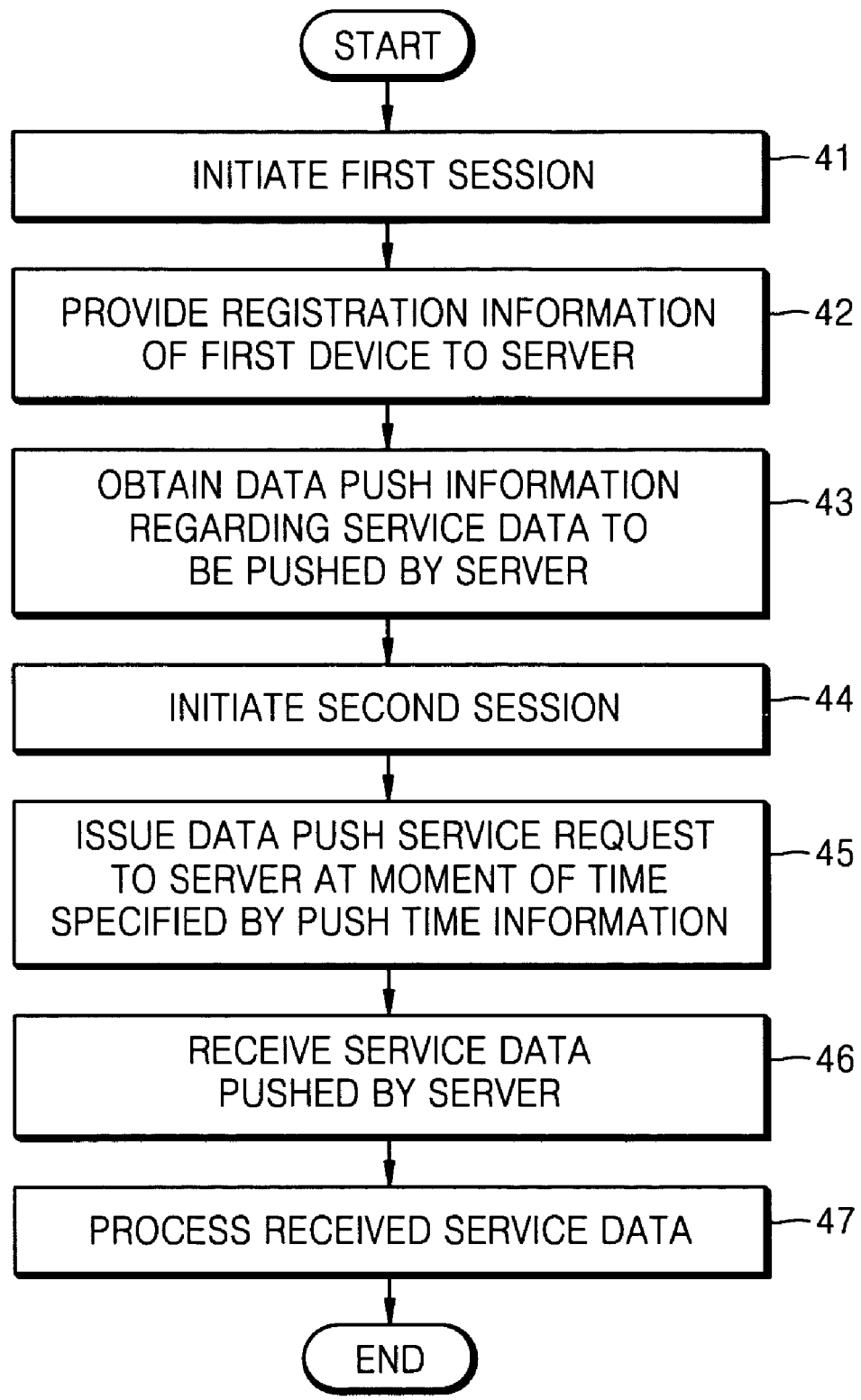
FIG. 4 is a flowchart illustrating a service data processing method according to an exemplary embodiment of the present invention.

FIG. 4 is a flowchart illustrating a service data processing method according to an exemplary embodiment of the present invention. Referring to FIG. 4, the service data processing method comprises a plurality of operations performed by the first device 21 illustrated in FIG. 3. Therefore, the description of the first device 21 detailed above with reference to FIG. 3 directly applies to the service data processing method according to the current exemplary embodiment of the present invention.

In operation 41, the first-device 21 initiates a first session for registering itself with the server 26.

In operation 42, during the first session, the first device 21 transmits a message containing registration information of the first device 21 to the server 26, thereby providing the registration information of the first device 21 to the server 26.

In operation 43, during the first session, the first device 21 receives a message containing data push information from the server 26 which has received the registration information of the first device 21, thereby obtaining the data push information.

In operation 44, the first device 21 initiates a second session for obtaining service data from the server 26.

In operation 45, during the second session, the first device 21 issues a data push service request to the server 26 with reference to the data push information. In detail, in operation 45, the first device 21 is in a standby mode until a time specified by push time information included in the data push information and transmits a message containing service request information to the server 26 at the time specified by the push time information, thereby issuing a data push service request to the server 26.

In operation 46, during the second session, the first device 21 receives service data pushed by the server 26 in response to the data push service request issued in operation 45 by the first device 21.

In operation 47, during the second session, the first device processes the received service data using a method predefined by a data push service requested by the first device 21.

Figure 5:
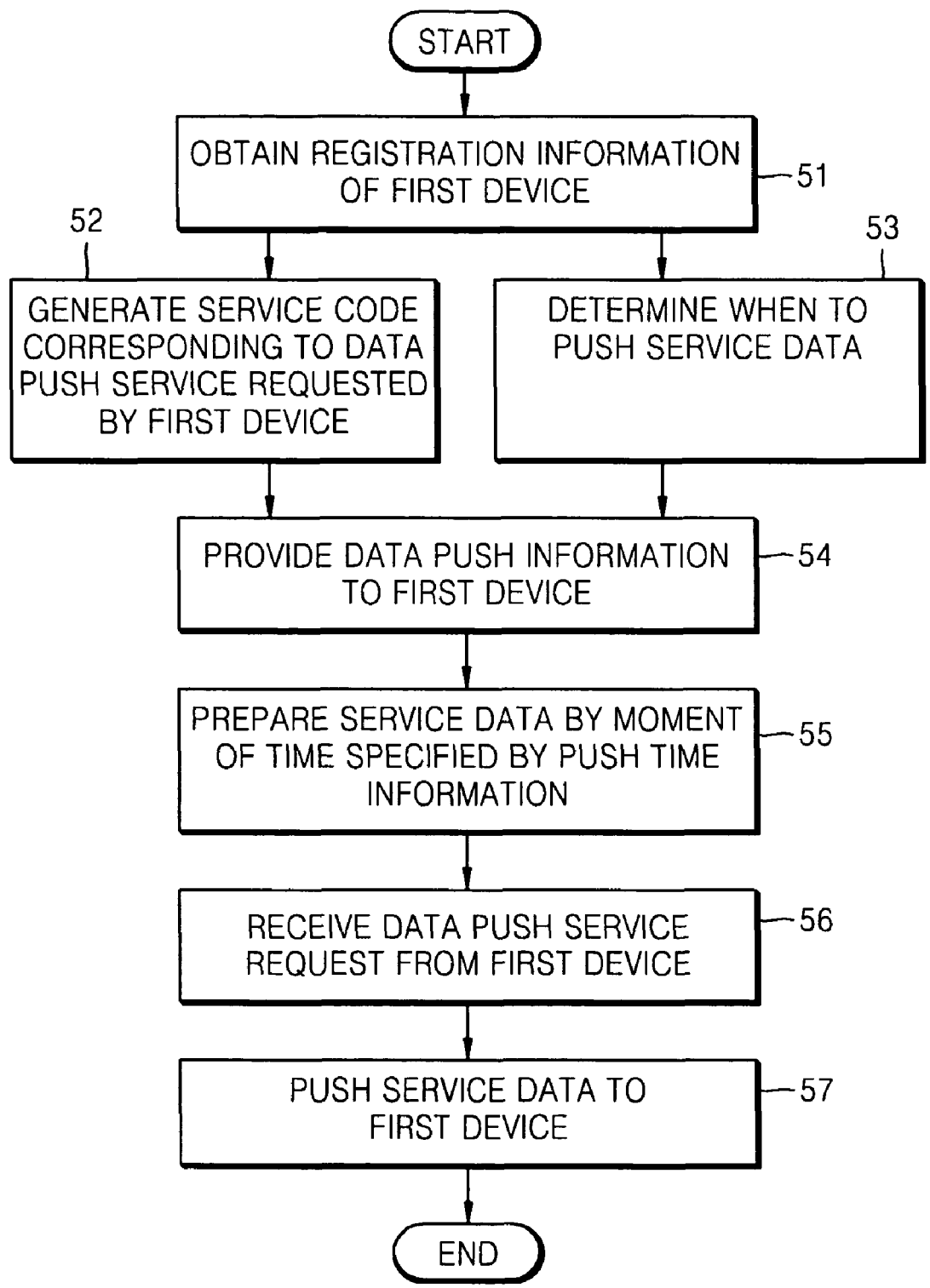
FIG. 5 is a flowchart illustrating a data push service method according to an exemplary embodiment of the present invention.

FIG. 5 is a flowchart illustrating a service data push method according to an exemplary embodiment of the present invention. Referring to FIG. 5, the service data push method comprises a plurality of operations performed by the server 26 illustrated in FIG. 3. Thus, the description of the server 26 detailed above with reference to FIG. 3 directly applies to the service data push method according to the current exemplary embodiment of the present invention.

In operation 51, during a first session initiated by the first device 21, the server 26 obtains registration information of the first device 21 from the first device 21 while the first device 21 registers itself with the server 26.

In operation 52, during the first session, the server 26 generates service code with reference to data push service information included in the registration information of the first device 21 and allots the service code to a data push service so that the data push service can be identified by the service code.

In operation 53, during the first session, the server 26 determines when to push service data and generates push time information based on the determination result. In detail, in operation 53, the server 26 calculates the amount of time required to generate service data corresponding to a data push service requested by the first device 21 with reference to the data push service information and determines when to push the service data.

In operation 54, during the first session, the server 26 transmits to the first device 21 a message containing data push information that comprises the service code generated in operation 52 and the push time information generated in operation 53, thereby providing the data push information to the first device 21.

In operation 55, during a second session initiated by the first device 21, the server 26 prepares the service data by a time specified by the push time information. In detail, in operation 55, the server 26 completes the generation of the service data by the time specified by the push time information.

In operation 56, during the second session, the server 26 receives a data push service request from the first device 21 that has obtained the data push information transmitted in operation 54 by the server 26. In detail, in operation 56, the server 26 receives a message containing service request information from the first device 21, thereby receiving a data push service request from the first device 21.

In operation 57, during the second session, the server 26 pushes the service data to the first device 21 as soon as it receives the message transmitted with reference to the push time information by the first device 21.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage.

According to the present invention, a server receives information of a device whenever it pushes service data to the device using a data pull method. Accordingly, the server does not need to maintain and manage the information of the device. Thus, it is possible to reduce the load of the server, and there is no need to frequently increase the storage capacity of the server.

In addition, according to the present invention, the server pushes service data using the data pull method and thus does not need special network infrastructure as is needed in the related art. Therefore, it is possible to provide data push services not only to such areas as corporate markets or large-scale B2B housing complexes but also to such areas as homes where ordinary network infrastructure such as a very high bit rate digital subscriber line (VDSL) network is established.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A service data push method comprising:
    initiating a first session between a device and a server, in which the device transmits a first data push service request and is provided with data push information regarding service data to be pushed to at least one device; and
    initiating a second session between the device and the server, in which the service data is pushed to the device when the server providing the data push service receives a second data push service request from the at least one device,
    wherein the first data push service request and the second data push service request comprise an address of the device and the second data push service request further comprises a service code that identifies the service data to be pushed,
    wherein the server generates the service code, calculates amount of time required to generate service data for the requested data push service, and determines time when to push the service data based on the calculation result,
    wherein the data push information comprises the generated service code and the determined time information, and
    wherein the server transmits the data push information and the service data based on address information provided by the device and does not maintain the address information of the device between the first session and the second session.

2. The service data push method of claim 1, wherein the data push information comprises push time information specifying when to push the service data, and the pushing comprises pushing the service data to the at least one device as soon as receiving a second data push service request issued with reference to the push time information from the at least one device.

3. The service data push method of claim 2, the method further comprising preparing the service data by a predetermined time specified by the push time information, wherein the pushing further comprises pushing the prepared service data to the at least one device as soon as receiving the second data push service request issued by the at least one device.

4. The service data push method of claim 1, wherein the data push information comprises the service code corresponding to a second data push service requested by the at least one device, and the pushing comprises pushing a service corresponding to the data push service identified by the service code included in the second data push service request.

5. The service data push method of claim 1, wherein the data push information comprises push time information specifying when to push the service data and the service code corresponding to a data push service requested by the at least one device, and the pushing comprises pushing a service corresponding to the data push service identified by the service code included in the second data push service request, with reference to the push time information from the at least one device.

6. The service data push method of claim 1, wherein the pushing comprises pushing the service data with reference to service request information included in a message comprising the second data push service request.

7. The service data push method of claim 6, wherein the pushing comprises pushing the service data to the device with reference to the address included in the service request information.

8. The service data push method of claim 6, wherein the service request information comprises a port number allotted for a data push service requested by the at least one device, and the pushing comprises pushing the service data via a predetermined port corresponding to a port number allotted for the requested data push service.

9. The service data push method of claim 1, further comprising:
    in the first and second data push service requests, the device providing service request information comprising a local and global address of the device and a port number of the device,
    wherein the server provides the device with the data push information based on the provided service request information.

10. The service data push method of claim 1, wherein the device comprises a service request unit that is in a standby state until a time specified in the data push information is reached.

11. The service data push method of claim 1, wherein the data push service comprises at least one of a TV broadcast service in which media content is consecutively transmitted by a TV broadcast station and an emailing service in which at least one email is pushed onto the device.

12. The service data push method of claim 1, wherein the data push service is a TV related service.

13. The service data push method of claim 1, wherein the service data comprises media content which is generated in a time period between the first and second sessions.

14. The service data push method of claim 1, wherein the address of the device comprises an address information which includes a local address of the device, a global address of the device, and a port number of the device, and wherein the server transmits the data push information and the service data based on address information provided by the device and does not maintain the address information of the device between the first session and the second session.

15. A server comprising:
    a push information providing unit which provides at least one remote device with data push information regarding service data to be pushed to the at least one device in response to receiving a first data push request from the at least one device during a first session;
    a service data push unit which, during a second session, pushes the service data when receiving a second data push service request from the at least one device which has obtained the data push information; and a data push information generation unit which generates the data push information, wherein the first data push service request and the second data push service request comprise an address of the device and the second data push service request further comprises a service code that identifies the service data to be pushed, wherein the data push information generation unit generates the service code, calculates amount of time required to generate service data for the requested data push service, and determines time when to push the service data based on the calculation result, wherein the generated data push information comprises the generated service code and the determined time information, and wherein the server transmits the data push information and the service data based on address information provided by the device and does not maintain the address information of the device between the first session and the second session.

16. The server of claim 15, wherein the data push information generation unit generates the data push information based on registration information of the at least one device provided in the first data push service request; and wherein the server further comprises a service preparation unit which receives the second data push service request from the at least one device, receives the data push information, and prepares the service data for the service data push unit.

17. A non-transitory computer-readable medium storing a computer program for executing a service data push method, the service data push method comprising:

providing at least one device with data push information regarding service data to be pushed to the at least one device in response to receiving a first data push service request from the at least one device during a first session; and pushing the service data to the at least one device when receiving a second data push service request by a server providing the data push service from the at least one device, wherein the first data push service request and the second data push service request comprise an address of the device and the second data push service request further comprises a service code that identifies the service data to be pushed, wherein the server generates the service code, calculates amount of time required to generate service data for the requested data push service, and determines time when to push the service data based on the calculation result, wherein the data push information comprises the generated service code and the determined time information, and wherein the server transmits the data push information and the service data based on address information provided by the device and does not maintain the address information of the device between the first session and the second session.

18. A service data processing method comprising: obtaining data push information regarding service data to be pushed from a server in response to transmitting a first data push service request by a receiving device during a first session;

issuing by the receiving device a second data push service request to the server with reference to the data push information during a second session; and receiving the service data in return for the second data push service request and processing the received service data, wherein the first data push service request and the second data push service request comprise an address of the device and the second data push service request further comprises a service code that identifies the service data to be pushed, wherein the server generates the service code, calculates amount of time required to generate service data for the requested data push service, and determines time when to push the service data based on the calculation result, wherein the data push information comprises the generated service code and the determined time information, and wherein the server transmits the data push information and the service data based on address information provided by the device and does not maintain the address information of the device between the first session and the second session.

19. The service data processing method of claim 18, wherein the issuing comprises issuing the second data push service request to the server at a time specified by the push time information included in the data push information.

20. The service data processing method of claim 18, wherein the issuing comprises issuing the second data push service request to the server by transmitting a message comprising the service code to the server.

21. The service data processing method of claim 18, wherein the issuing comprises issuing the second data push service request to the server by transmitting a message comprising information of at least one device to the server.

22. The service data processing method of claim 21, wherein the information of the at least one device comprises an address of the at least one device and a port number of the at least one device.

23. A device comprising:

a push information obtaining unit which obtains data push information regarding service data to be pushed from a server by transmitting to the server a first data push request during a first session;

a service request unit which issues a second data push service request transmitted from the device to the server with reference to the data push information during a second session; and a service data processing unit which receives service data pushed by the server in return for the second data push service request and processes the received service data, wherein the first data push service request and the second data push service request comprise an address of the device and the second data push service request further comprises the data push information comprising a service code that identifies the service data to be pushed, wherein the push information obtaining unit obtains the service code from the server and which is generated by the server and obtains time when to push the service, which is determined based on calculating by the server amount of time required to generate service data for the requested data push service by the server, wherein the data push information comprises the generated service code and the determined time information, and wherein the server transmits the data push information and the service data based on address information provided by the device and does not maintain the address information of the device between the first session and the second session.

24. The device of claim 23, the device further comprising a device registration unit which registers the device with the server, wherein the server generates the data push information.

25. A non-transitory computer-readable medium storing a computer program for executing a service data processing method, the service data processing method comprising:
- obtaining data push information regarding service data to be pushed from a server in response to a first data push service request during a first session between the server and a receiving device;
- issuing a second data push service request from the receiving device to the server with reference to the data push information during a second session; and
- receiving the service data in return for the data push service request and processing the received service data,
- wherein the first data push service request and the second data push service request comprise an address of the device and the second data push service request further comprises the data push information comprising a service code that identifies the service data to be pushed,
- wherein the server generates the service code, calculates amount of time required to generate service data for the requested data push service, and determines time when to push the service data based on the calculation result,
- wherein the data push information comprises the generated service code and the determined time information, and
- wherein the server transmits the data push information and the service data based on address information provided by the device and does not maintain the address information of the device between the first session and the second session.

26. A data push service system comprising:
- a server which provides a remote device with data push information comprising timing of a push service and is regarding service data to be pushed to at least one device during a first session in response to a first data push request from the at least one device; and
- the at least one device which obtains the data push information from the server and issues a second data push service request to the server with reference to the obtained timing of the push service provided in the data push information during a second session,
- wherein the server pushes the service data to the at least one device when receiving the data push service request from the at least one device,
- wherein the first data push service request and the second data push service request comprise an address of the device and the second data push service request further comprises a service code that identifies the service data to be pushed,
- wherein the server generates the service code, calculates amount of time required to generate service data for the requested data push service, and determines time when to push the service data based on the calculation result,
- wherein the data push information comprises the generated service code and the determined time information, and
- wherein the server transmits the data push information and the service data based on address information provided by the device and does not maintain the address information of the device between the first session and the second session.

27. The data push service system of claim 26, wherein:
the server is a central server,
the remote device sends the first data push service request to the server to obtain the data push information comprising the service code,
the data push information comprises a schedule for the data push service, and
the remote device sends the second push service request based on the schedule in the data push information.

* * * * *